(12) United States Patent
Sulcer et al.

(10) Patent No.: US 11,693,682 B2
(45) Date of Patent: *Jul. 4, 2023

(54) METHOD AND SYSTEM FOR DISASTER RECOVERY OF A REGIONAL CLOUD BASED DESKTOP FABRIC

(71) Applicant: Workspot, Inc., Campbell, CA (US)

(72) Inventors: David T. Sulcer, Campbell, CA (US); Anushree K. Pole, Campbell, CA (US); Shiva P. Madishetti, Campbell, CA (US); Virabrahma P. Krothpalli, Campbell, CA (US); Amitabh B. Sinha, Campbell, CA (US); Jimmy Chang, Campbell, CA (US); Raminder S. Channe, Campbell, CA (US)

(73) Assignee: Workspot, Inc., Campbell, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/938,427

(22) Filed: Jul. 24, 2020

(65) Prior Publication Data

US 2021/0026679 A1 Jan. 28, 2021

Related U.S. Application Data

(63) Continuation-in-part of application No. 16/593,816, filed on Oct. 4, 2019.

(Continued)

(51) Int. Cl.
*G06F 9/455* (2018.01)
*G06F 9/50* (2006.01)
*G06F 11/14* (2006.01)

(52) U.S. Cl.
CPC ........ *G06F 9/45558* (2013.01); *G06F 9/5077* (2013.01); *G06F 11/1469* (2013.01);

(Continued)

(58) Field of Classification Search
CPC ................. G06F 9/452; G06F 9/45558; G06F 2009/45562; G06F 2009/4557;

(Continued)

(56) References Cited

U.S. PATENT DOCUMENTS 10,691,547 B1 * 6/2020 Moran ................ G06F 11/1453
2017/0374136 A1 * 12/2017 Ringdahl .............. G06F 9/5072

(Continued)

FOREIGN PATENT DOCUMENTS

CA 2891984 A1 * 8/2015 ......... G06F 9/45558

*Primary Examiner* — David R Lazaro
*Assistant Examiner* — Mariegeorges A Henry
(74) *Attorney, Agent, or Firm* — Nixon Peabody LLP

(57) ABSTRACT

A system and method for ensuring the availability of virtual desktops in a cloud based system. The system includes a primary regional datacenter having a primary desktop pool accessible by a desktop client providing access to a desktop to a desktop user. A secondary regional datacenter includes a secondary desktop pool. A control plane orchestrates communication between the desktop client and the regional datacenters. The control plane creates a copy of the desktop from the primary regional datacenter. The control plane performs an activation procedure when a disaster event occurs. The activation procedure includes creating the desktop in the secondary desktop pool from the copy. The activation procedure also directs the desktop client to the secondary desktop pool to access the desktop from the secondary regional datacenter. A deactivation procedure directs the desktop client in the secondary desktop pool to reestablish availability to desktops in the primary desktop pool.

34 Claims, 7 Drawing Sheets

Related U.S. Application Data

(60) Provisional application No. 62/970,853, filed on Feb. 6, 2020, provisional application No. 62/878,320, filed on Jul. 24, 2019.

(52) U.S. Cl.
CPC ................ *G06F 2009/4557* (2013.01); *G06F 2009/45562* (2013.01); *G06F 2009/45595* (2013.01); *G06F 2209/5011* (2013.01)

(58) Field of Classification Search
CPC ............. H04L 41/5012; H04L 67/1008; H04L 67/1095; H04L 41/0893; H04L 41/16; H04L 41/046; H04L 41/0843; H04L 41/147; H04L 41/5025; H04L 43/0823; H04L 43/0852; H04L 41/0806; H04L 41/5051
USPC .............................................. 709/220; 718/1
See application file for complete search history.

(56) References Cited

U.S. PATENT DOCUMENTS

2019/0370132 A1* 12/2019 Salapura ............. G06F 11/3037
2020/0089573 A1* 3/2020 Baggerman ......... G06F 11/1464

* cited by examiner

METHOD AND SYSTEM FOR DISASTER RECOVERY OF A REGIONAL CLOUD BASED DESKTOP FABRIC

PRIORITY CLAIM

This application claims priority to U.S. Provisional Application 62/878,320 filed Jul. 24, 2019, U.S. Provisional Application 62/970,853 filed Feb. 6, 2020, and U.S. application Ser. No. 16/593,816 filed on Oct. 4, 2019. The entirety of those applications are hereby incorporated by reference.

TECHNICAL FIELD

The present disclosure relates generally to network based systems. More particularly, aspects of this disclosure relate to a cloud fabric that allows provision of a virtual desktop to users in a region from a cloud fabric having resources for providing the desktop to allow for disaster recovery within the fabric.

BACKGROUND

Computing systems that rely on applications operated by numerous networked computers are ubiquitous. Information technology (IT) service providers thus must effectively manage and maintain very large-scale infrastructures. An example enterprise environment may have many thousands of devices and hundreds of installed software applications to support. The typical enterprise also uses many different types of central data processors, networking devices, operating systems, storage services, data backup solutions, cloud services, and other resources. These resources are often provided by means of cloud computing—the on-demand availability of computer system resources over the public internet or other networks, especially data storage and computing power, without direct active management by the user.

Users of networked computers such as in a cloud based system may typically log into a computer workstation or client device and are provided a desktop application that displays an interface of applications and data available via the network or cloud. Such desktop applications will be initially accessed when a user logs in, but may remain active to respond to user operation of applications displayed on the desktop interface. While users may activate the desktop application on any computer on the network, most users work from one specific computer.

Remote desktop virtualization solutions have been available for over a decade now. These solutions provide virtual desktops to network users. In remote desktop virtualization offerings, there is typically a capability of associating a remote desktop virtualization template in a particular datacenter with a remote desktop virtualization pool in the same datacenter as part of the general configuration model. This remote desktop virtualization template is customized with the image of the right desktop for a particular remote desktop virtualization use case.

A problem long-associated with enterprise computing is how to mitigate the risk of a disaster event impacting an entire group of computer desktop users, leaving them without access to the applications, files, networks and other resources needed to do critical work. In the case of a desktop service, in which every computer desktop is virtualized and hosted in the cloud, disaster events present both an additional challenge and an additional opportunity to manage this risk. The opportunity is that such virtual desktops are less vulnerable to disasters affecting access physical computer desktops. The challenge is that such virtual desktops by their nature rely on cloud infrastructure that is subject to disaster events outside of the control of the network administrators responsible to maintain them.

Disaster events can include loss of access due to a public cloud infrastructure failure for unknown duration, such as a natural disaster, that forces a regional cloud datacenter or the networks it depends on to go offline. Other disaster events may include the results of unintentional and/or malicious corruption of virtual desktops and/or infrastructure elements. Such corruption requires restoration of virtual desktops to a known uncorrupted state.

Cloud providers generally provide various capabilities that can be used to mitigate some disasters, but no comprehensive regional disaster recovery orchestration solution is available. For example, a desktop service administrator currently has to perform many manual and error-prone steps for disaster recovery. The following is an example of the routine required to mitigate a disaster event affecting persistent desktops, which may be changed by desktop users, and therefore must be individually saved. Before the disaster event, off-site backups of each desktop virtual machine disk are performed while minimizing disruption to users who may need to be told to log off or power down the desktop. When the disaster event occurs, administrators must determine how many replacement desktops should be created in a secondary regional datacenter. The administrator must then notify affected desktop users in a timely manner.

For each user, the replacement desktop must be provisioned in a secondary regional datacenter. Metadata needed to manage the new desktop must be captured. The administrator must manually copy the disk images from offsite storage to the new regional datacenter, without overtaxing the network bandwidth. The desktops are then restored from the corresponding backup disk. The proper end user must then be assigned. The configuration needed for a desktop client to access the new desktop must be created. The configuration then must be distributed to the correct end user. The administrator must also ensure that the end user is able to access the new desktop with correct restoration of the state of the desktop.

Once the effect of the disaster event has passed, the administrator must determine how to reverse the process to bring users back to the primary regional datacenter, which is generally desired. This can as or more complex as the preceding steps to provision the secondary regional datacenter, including backup, re-provisioning, image copying, reconfiguration, and notification for each affected desktop. All resources created for handling the disaster event must then be cleaned up.

In the case of non-persistent desktops the process can be somewhat easier since such desktops do not require any changes made by a desktop user to be saved. However, there are also manual steps involved in the process. When a primary desktop pool is established, a backup of the desktop template is created. Whenever the desktop template changes, the backup must be updated as well.

In the case of non-persistent desktops, when a disaster event occurs, the system determines how many replacement desktops should be created and made available in a secondary regional data center. Affected users are notified in a timely manner. For each affected non-persistent pool, a new non-persistent pool is created in a secondary regional data center, and desktop template images from offsite storage is manually copied to the secondary regional datacenter. Also, the configuration needed for a virtual client is created to point to the new pool, and distributed to the correct users. The system ensures that the end user is able to access the new desktop based on the correct desktop template.

In the case of non-persistent desktops, once the effect of the disaster event has passed, it must be determined how to reverse the process to bring users back to the primary regional datacenter. This can be more complex as the preceding steps to provision the secondary regional datacenter, including backup of the desktop template, re-provisioning, image copying, reconfiguration, and notification for each affected desktop.

Furthermore, managing persistent pools can be challenging if there is a need to upgrade each persistent desktop to a new kind of desktop virtual machine, even when there is no disaster event. Similar steps to those used in regional disaster recovery must be carried out manually to migrate a user from one persistent pool to another without losing their desktop state.

Thus, there is a need for a system that automatically ensures the availability of persistent desktops supported by a regional data center in a disaster event. There is another need a system that automatically ensures the availability of non-persistent desktops supported by a regional datacenter in a disaster event. There is another need for a system that can reactivate a regional datacenter to support desktops after the resolution of a disaster event.

SUMMARY

One disclosed example is a regional virtual desktop system including a primary regional datacenter having a primary desktop pool providing access to a desktop to a desktop user of a desktop client. A secondary regional datacenter including a secondary desktop pool. A control plane orchestrates communication between the desktop client and the primary and secondary regional datacenters. The control plane creates a copy of the desktop from the primary regional datacenter and performs an activation procedure when a disaster event occurs. The activation procedure includes creating the desktop in the secondary desktop pool from the copy. The activation procedure also includes directing the desktop client to the secondary desktop pool to access the desktop from the secondary regional datacenter.

A further implementation of the example system is where the control plane is deactivates the secondary desktop pool and redirects the desktop client to access the desktop from the primary desktop pool of the primary regional datacenter after the disaster event is over. Another implementation is where the desktop is a persistent desktop and where the copy is created by creating a snapshot of the desktop at a recovery point. Another implementation is where the control plane creates another snapshot on a periodic basis. Another implementation is where the periodic basis is based on usage data of the desktop. Another implementation is where the periodic basis includes postponing the creation operation until the desktop user terminates their session of the desktop. Another implementation is where the creation of the desktop snapshot is performed incrementally relative to snapshots of other desktops in the primary desktop pool according to a policy to conserve time, bandwidth, or storage cost. Another implementation is where the control plane provides multiple disaster recovery points corresponding to snapshots at different times and stores the snapshots. Another implementation is where the desktop snapshots are kept according to a retention policy. Another implementation is where the control plane suspends creating a desktop recovery point for the desktop of the secondary desktop pool. The control plane selects an optional desktop recovery point for the primary desktop pool when the regional datacenter is reactivated. Another implementation is where the control plane throttles copying of snapshots between the primary regional datacenter and the secondary regional datacenter to optimize cloud resources. Another implementation is where the desktop is a non-persistent desktop created from a desktop template, and where the secondary regional datacenter includes a copy of the desktop template to create the desktop in the secondary desktop pool. Another implementation is where the control plane copies the desktop template whenever a change is made to the desktop template. Another implementation is where the control plane accesses the desktop template across additional regional datacenters. Another implementation is where the activation is performed automatically according to a preconfigured rule. Another implementation is where the primary desktop pool is provided through a first public cloud provider and the secondary desktop pool is provided through a second, different public cloud provider. Another implementation is where the system includes a tertiary regional datacenter. The control plane executes a recovery routine to copy the secondary desktop pool to a tertiary desktop pool of the tertiary regional datacenter.

Another disclosed example is a method for ensuring service for virtual desktops. The virtual desktops are supported by a regional datacenter and a secondary datacenter orchestrated by a control plane to allow a desktop client agent to access a desktop from a primary desktop pool of the regional datacenter. A copy of the desktop is created from the primary desktop pool via the control plane. An activation via the control plane is accepted when a disaster event occurs. The desktop in a secondary desktop pool of the secondary datacenter is created from the copy. The desktop client is directed to the secondary desktop pool to access the desktop from the secondary regional datacenter.

A further implementation of the example method includes deactivating the secondary desktop pool and redirecting the desktop client to access the desktop from the primary desktop pool of the primary regional datacenter after the disaster event is over. Another implementation is where the desktop is a persistent desktop and where the copy is created by creating a snapshot of the desktop at a recovery point. Another implementation is where the method includes creating another snapshot on a periodic basis. Another implementation is where the periodic basis is based on usage data of the desktop. Another implementation is where the periodic basis includes postponing the creation operation until the desktop user terminates their session of the desktop. Another implementation is where the creation of the desktop snapshot is performed incrementally relative to snapshots of other desktops in the primary desktop pool according to a policy to conserve time, bandwidth, or storage cost. Another implementation is where the method includes providing multiple disaster recovery points corresponding to snapshots at different times and storing the snapshots. Another implementation is where the desktop snapshots are kept according to a retention policy. Another implementation is where the method includes suspending the creation of a desktop recovery point for the desktop of the secondary desktop pool. An optional desktop recovery point for the primary desktop pool is selected when the regional datacenter is reactivated. Another implementation is where the method includes throttling copying of snapshots between the primary regional datacenter and the secondary regional datacenter optimize cloud resources. Another implementation is where the desktop is a non-persistent desktop created from a desktop template, and where the secondary regional datacenter includes a copy of the desktop template to create the desktop in the secondary desktop pool. Another implementation is where the method includes copying the desktop template whenever a change is made to the desktop template. Another implementation is where the control plane accesses the desktop template across additional regional datacenters. Another implementation is where the activation is performed automatically according to a preconfigured rule. Another implementation is where the primary desktop pool is provided through a first public cloud provider and the secondary desktop pool is provided through a second, different public cloud provider. Another implementation is where the method includes executing a recovery routine to copy the secondary desktop pool to a tertiary desktop pool of a tertiary regional datacenter.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
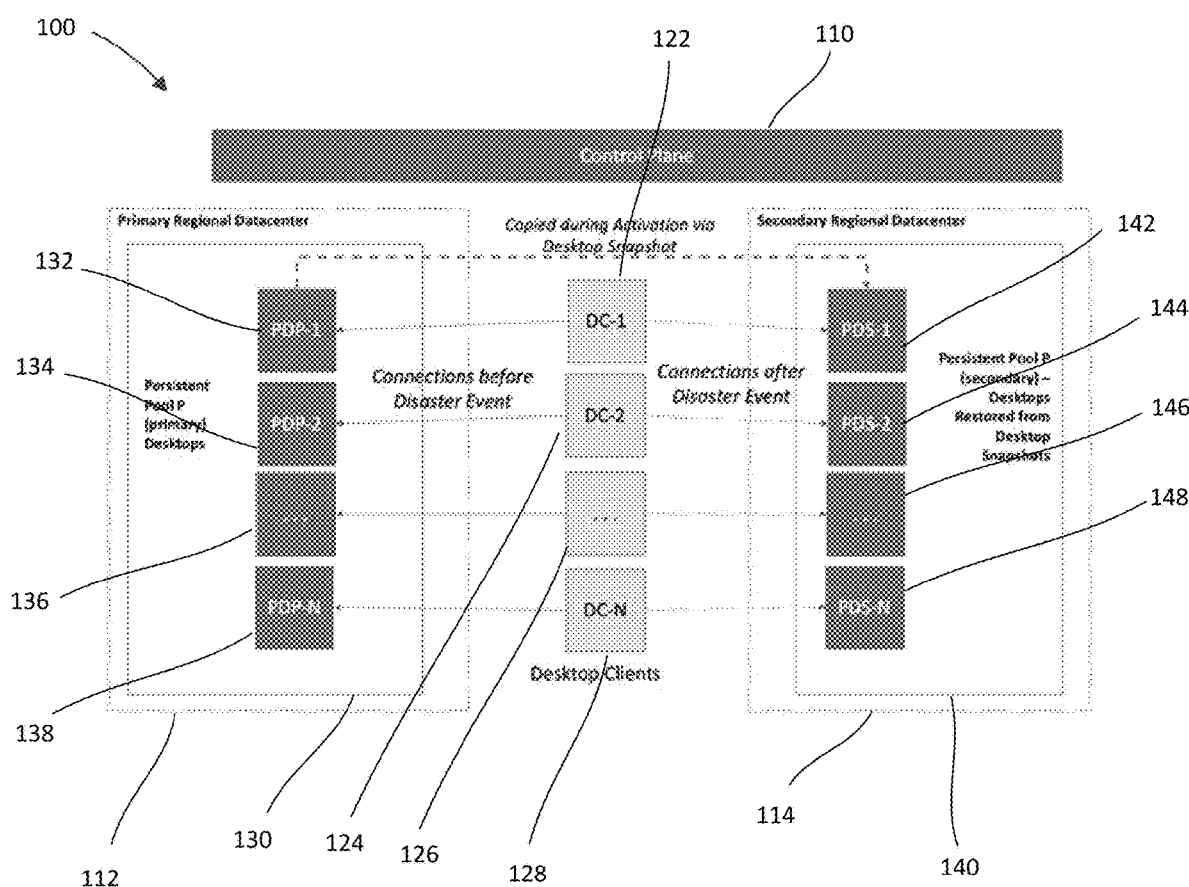
FIG. 1 is a high-level block diagram illustrating an example cloud desktop fabric allowing access to persistent desktops regionally in the event of a disaster event.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure relates to a regional disaster recovery system for a virtual desktop system. The system includes regional data centers that are managed by a control plane. Disaster events can be mitigated using additional cloud infrastructure combined with an effective control plane. The control plane provides an automated, policy-driven solution to the activation of a regional disaster recovery. The control plane orchestrates the creation of desktop recovery points, manages and optimizes automated backup and restore activities, and initiates the automatic reconfiguration of pools in a secondary regional datacenter, so that desktop users are minimally impacted. Furthermore, it provides orchestration of the de-activation of the regional disaster recovery policy, allowing desktop users to be returned to using their primary regional datacenter.

The following are definitions of terms used in this disclosure.

An agent is software that performs certain operations and monitoring tasks that has direct access to, or runs on, some virtual computing resource and may maintain a duplex communication channel with a desktop service control plane.

Activation is the orchestration of restoring desktop snapshots described by a desktop recovery point to a secondary desktop pool.

A control plane is a system to coordinate the creation, management, and monitoring of cloud infrastructure resources to provide a desktop service.

A datacenter is a collection of computing resources, such as servers, in one physical location.

Deactivation is the orchestration of restoring a primary desktop pool once the disaster event is passed and the primary regional datacenter is no longer corrupt or inaccessible.

A desktop is a virtual desktop, or, a regional data center server creating a virtual desktop or virtual application experience. Thus, a desktop is a computer's interactive desktop or application, or other experience provided by remote desktop virtualization via a desktop service.

A desktop client is software that provides graphical and input access to a desktop as directed by a control plane. It may be installed on a standard desktop or mobile operating system, or be pre-installed on dedicated hardware devices, or downloaded dynamically via a web browser application, or deployed in some other way. Like an agent, it may also perform certain operations and monitoring tasks and may maintain a duplex communication channel with a desktop service control plane.

A desktop recovery point is the identification of a desktop snapshot of a persistent desktop as of some preceding time, which may be free of corruption associated with a disaster event.

A desktop snapshot is a preserved version of the state of a persistent desktop that can be used to restore it in a regional data center.

A desktop template is a virtual machine kept in powered-off state that can be cloned to create desktops. Thus, a desktop template is a desktop service resource used to define a prototypical desktop, including specific configurations, installed applications, and everything else needed to instantiate a desktop for some category of desktop users.

A desktop user is a person who accesses a remote desktop using desktop client software.

A disaster event is an occurrence that corrupts and/or prevents access to desktops in some primary regional datacenter. Disaster events may include natural disasters such as earthquakes, power disruptions, or cyberattacks.

A non-persistent desktop is a desktop that is logically part of a desktop pool, but is re-created and assigned upon every connection session, and does not preserve its state (e.g., files and configurations) across connection sessions.

A persistent desktop is a desktop that is assigned to a particular user, and preserves its state (e.g., files and configurations) across connection sessions.

Pool desktops are a set of desktops managed by the desktop service control plane as a unit.

A primary desktop pool is a set of desktops in a primary regional datacenter that are assigned and accessible to desktop users under normal (non-disaster) circumstances.

A primary regional datacenter is an environment where a primary desktop pool is available under normal (non-disaster) circumstances.

A regional datacenter is a datacenter providing virtualized computing resources to implement a desktop service for efficient access within a single geography or availability zone.

A secondary desktop pool is a restored set of desktops made available in a secondary regional datacenter.

A secondary regional datacenter is an environment where a desktop pool can be available that is not affected by a disaster event.

FIG. 1 shows a high level block diagram of a cloud based desktop service system 10, providing virtual persistent desktops for users in multiple regions. The system 100 includes a control plane 110, a primary regional datacenter 112, and a secondary regional datacenter 114. A series of desktop clients 122, 124, 126 and 128 may be connected to either of the datacenters 112 and 114. Each of the desktop clients 122, 124, 126 and 128 have a corresponding desktop user that accesses the desktop through the desktop client. Each of the desktop clients communicate with the control plane 110 and also supports a remote display protocol in order for users to connect to a desktop application run by the regional cloud datacenter 112. Thus, each of the desktop users who use a particular pool 130 of primary desktops normally accesses them in the primary regional data center 112 via the respective desktop client that is executed by a computing device operated by the desktop user.

The datacenters such as the datacenters 112 and 114 typically comprises IT infrastructure that is physically managed by a cloud-provider's IT personnel. The IT infrastructure may include servers, network infrastructure, load balancers, gateways, operating systems, software, and so on. A turnkey provider of desktop services can create and manage these on behalf of customers as virtualized resources. If there is an issue related to an application reported by a user, the desktop service provider can check the health of the resources used by the desktops or applications.

The primary regional data center 112 includes an example desktop pool 130 that includes a series of primary desktops 132, 134, 136, and 138. The secondary data center 114 may create a secondary desktop pool 140 that includes secondary desktops 142, 144, 146, and 148. The secondary desktops 142, 144, 146, and 148 are created from desktop snapshots that are taken from the primary desktops 132, 134, 136, and 138. In this example, the same public cloud provider may provide both the primary desktop pool 130 and the secondary desktop pool 140. Alternatively, a different public cloud provider may provide the secondary desktop pool 140.

Although there is only one desktop pool in the primary regional datacenter 112 in this example, it is to be understood the primary regional datacenter 112 may support multiple desktop pools based on which groups users belong to and their job requirements. Thus, the disclosed activation and deactivation of processes for disaster events may be applied to multiple pools. In this example, pools may include a developer desktop pool, an engineering workstation pool, or a call center application pool. Pools such as the developer desktop pool or the engineering workstation pool may allow desktop users in the pool to use a desktop that allows access to graphic processing unit (GPU) based applications. Other example applications may include those applications used for the business of the enterprise, for example, ERP (enterprise resource planning) applications or CRM (customer relationship management) applications. These applications allow users to control the inventory of the business, sales, workflow, shipping, payment, product planning, cost analysis, interactions with customers, and so on. Applications associated with an enterprise may include productivity applications, for example, word processing applications, search applications, document viewers, and collaboration applications. Applications associated with an enterprise may also include applications that allow communication between people, for example, email, messaging, web meetings, and so on.

Desktop users each may use a client device to access the desktop service via a desktop client such as the desktop client 122 in FIG. 1. Client devices may be any device having computing and network functionality, such as a laptop computer, desktop computer, smartphone, or tablet. Client devices execute the desktop client to access remote applications such as the desktop. The client application authenticates user access to the applications. A client device can be a conventional computer system executing, for example, a Microsoft™ Windows™-compatible operating system (OS), Apple™ OS X, and/or a Linux distribution. A client device can also be a client device having computer functionality, such as a personal digital assistant (PDA), mobile telephone, tablet, video game system, etc.

The control plane 110 can manage the entire lifecycle of the implementation of a regional datacenter, from creating and managing the required desktops, to monitoring and analyzing the stream of operational data collected, enforcing security policies, and optimizing the experience for IT administrators and desktop users. For example, the service control plane 110 may register a set of a virtual networks, virtual storage resources, and more. Within a virtual network, the control plane 110 may further register and coordinate the use of gateways, enterprise connectors, desktop templates, connection brokers, and more.

In this example, a system administrator may set up a disaster recovery procedure for a primary desktop pool such as the desktop pool 130. This procedure includes first defining desktop recovery points for making snapshots of desktops of a primary desktop pool such as the desktop pool 130. For example, administrators can choose to create desktop recovery points on a schedule with a nightly, weekly, monthly frequency or any combination of these.

The system 100 in FIG. 1 preserves the persistent desktops for the desktop users of the desktop clients 122, 124, 126 and 128. The procedure defines the secondary desktop pool 140 in the secondary regional datacenter 114. The defined secondary desktop pool 140 is normally inactive. Redundant infrastructure is created in the secondary regional datacenter 114 to support the secondary desktop pool 140. The infrastructure may include regional datacenter gateways to allow access to desktops from desktop clients that are outside the private network, and other resources such as load balancers, storage, monitoring tools, or other network appliances.

In this example, the system administrator may specify the timing of the creation of desktop snapshots to avoid disruption to desktop users, possibly including an option to postpone the operation for individual desktops until the corresponding desktop user terminates their session. The control plane 110 may throttle the copying of desktop snapshots between the primary regional datacenter 112 and the secondary regional datacenter 114 to optimally utilize cloud resources such as network bandwidth.

Full and/or incremental backups of the desktops in the primary desktop pool 130 are created automatically. This can include additional policy-driven logic to optimize these activities for storage cost, time, bandwidth, or other resources. The creation of desktop snapshots can be optimized based on usage data tracked by the control plane 110 to minimize disruption to desktop users. The creation of desktop snapshots can be optimized by avoiding creating new desktop snapshots from unused desktops. The creation of the desktop snapshots can also be deferred until the desktop user disconnects from the desktop.

When a disaster event occurs, the disaster recovery process may be activated either by the administrator or automatically by the control plane 110. Activation occurs as a single action, to minimize the time required for desktop users to have their desktop service restored. In this example, the administrator can decide to activate the regional disaster recovery procedure with a single command. The administrator can select from multiple desktop recovery points, to avoid restoration from possibly corrupt desktop snapshots. In addition, the control plane 110 may be configured with rules to automatically activate the disaster recovery procedure under certain circumstances.

Administrators and affected desktop users are notified of the disaster event and informed of the brief maintenance period required to restore service. The control plane 110 manages the process of informing the affected desktop users based on configurations of pools, groups, users, and the regional disaster recovery routine. The control plane 110 directs desktop clients 122, 124, 126, and 128 to avoid connection with the primary pool 130. The desktop clients 122, 124, 126, and 128 also provide helpful messages to desktop users to understand why the primary pool is temporarily not available.

Desktop restoration automatically begins where desktop snapshots are either already in place in the secondary regional datacenter 114. Alternatively, the desktop snapshots can be quickly copied there from offsite storage. New desktops in the secondary pool 140 are automatically provisioned from the desktop snapshots for each desktop user. The control plane 110 re-assigns each desktop user to the secondary pool 140 and to the correct persistent desktop.

The control plane 110 monitors the disaster recovery process by collecting information from the cloud provider and from desktops themselves. The control plane 110 observes the status of the batch operations occurring during restoration. The control plane 110 also notifies administrators of the progress of the secondary desktop pool readiness at regular intervals. The length of this process will vary depending on the execution time of the cloud service provider calls, the level of throttling of these services by the cloud service provider, and the time it takes desktops to be started and initialized. In optimal conditions it might take well under a minute for each desktop, and multiple desktops may be processed in parallel.

Once the secondary desktops have been created, the control plane 110 redirects the desktop clients 122, 124, 126, and 128 to the secondary desktop pool 140. The desktop clients 122, 124, 126, and 128 are redirected to allow connection to the secondary desktop pool 140, providing a seamless experience to desktop users. The desktop users are notified that the disaster event has been mitigated. The desktop users may then proceed to use the newly provisioned desktops 142, 144, 146, and 148 in the secondary pool 140 running in the secondary regional datacenter 114.

Once the disaster event is over and the primary regional datacenter 112 becomes operational, a deactivation routine can be activated in order to return desktop users to the normal use of the primary regional datacenter 112. The process of deactivation includes a notification that the primary regional datacenter 112 is deemed to be available, completely functioning and uncorrupt. The evaluation of the availability of the primary regional datacenter 112 may be based on health monitors or other sensors. Alternatively, the notification may be made via the judgement of a system administrator.

Once, the deactivation is activated, the control plane 110 begins preparing for the de-activation operation. Desktop snapshots are created for the persistent desktops 142, 144, 146, and 148 within the secondary desktop pool 140. This can be performed immediately if so configured or the activation can be scheduled if so configured.

Administrators and affected end-users are notified of the recovery assessment and informed of the brief maintenance period required to restore service in the primary regional datacenter 112. The control plane 110 manages the process of notification the affected desktop users based on configurations of pools, groups, users, and the regional disaster recovery routine.

The desktop clients 122, 124, 126, and 128 are directed to avoid connection with the secondary pool 140. The desktop clients 122, 124, 126, and 128 provide helpful messages to understand why the secondary pool 140 is not available.

Desktop snapshots are created to move the persistent desktop state back to the primary persistent pool 130. The desktop snapshots can be created immediately. The created desktop snapshots are copied to the primary regional datacenter 112. The infrastructure of the primary regional datacenter 112 is checked to ensure it is operational. Each desktop is restored from its corresponding desktop snapshot.

The control plane 110 monitors the process by observing the status of the batch operations occurring during restoration. The control plane 110 also notifies administrators of the progress of the rehabilitation of the primary desktop pool 130 and its readiness at regular intervals. The control plane 110 redirects the desktop clients 122, 124, 126, and 128 to the primary desktop pool 130. The desktop clients 122, 124, 126, and 128 are redirected to allow connection to the primary desktop pool 130, providing a seamless experience to desktop users.

The desktop users are notified that the deactivation process is complete. The control plane 110 then frees up any resources required only during activation or deactivation such as the desktops in the secondary desktop pool 140, as well as any other resources no longer needed such as gateways or templates.

Figure 2:
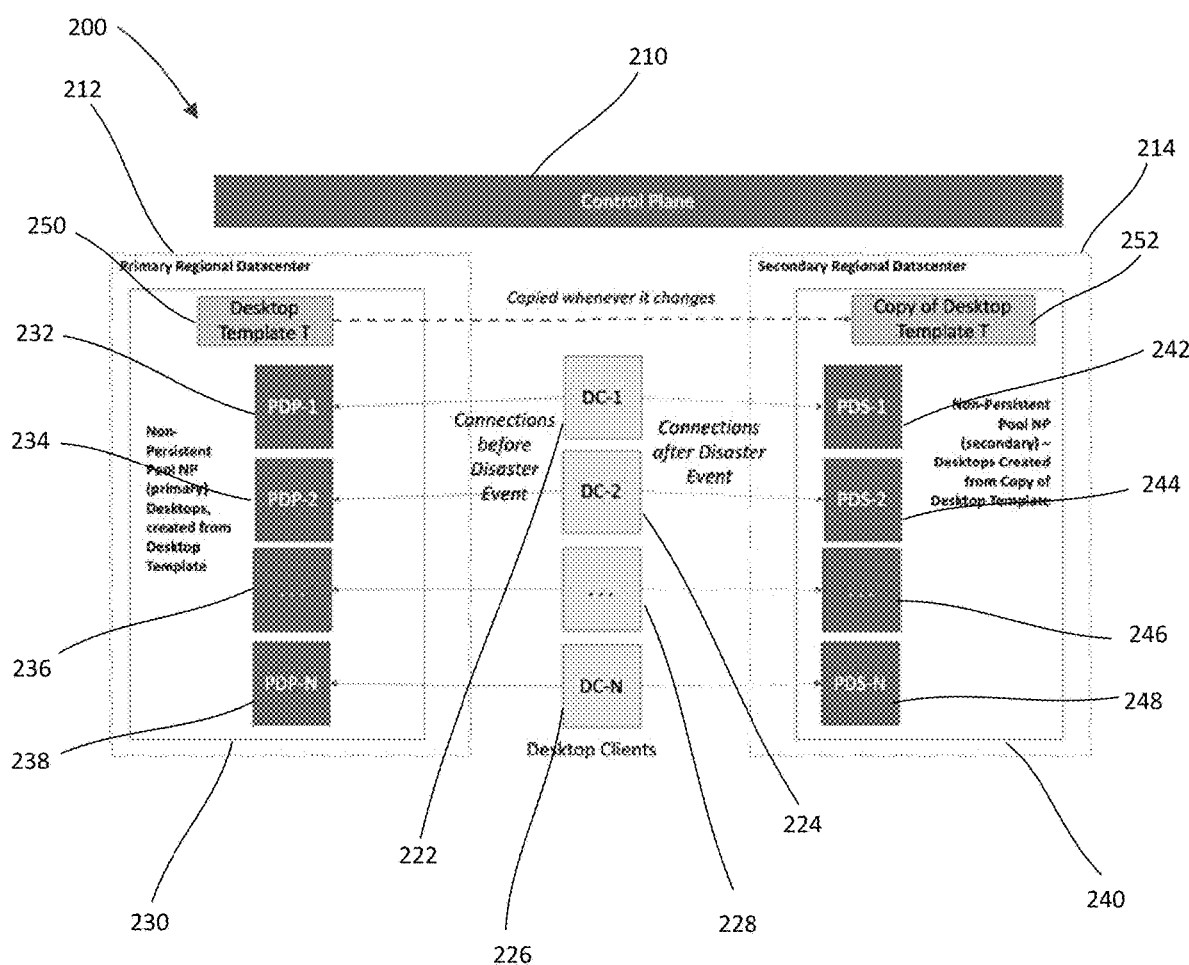
FIG. 2 is a high-level block diagram illustrating an example cloud desktop fabric allowing access to non-persistent desktops regionally in the event of a disaster event.

For non-persistent desktops, the desktop migration process is somewhat simpler, because reconnecting desktop users are always given a fresh desktop based on a desktop template, regardless of any disaster event, every time they log in. FIG. 2 shows a high level block diagram of another example cloud based desktop service system 200. The system 200 includes a control plane 210, a primary regional datacenter 212, and a secondary regional datacenter 214. A series of desktop clients 222, 224, 226, and 228 may be connected to either of the datacenters 212 and 214. Each of the desktop clients 222, 224, 226, and 228 have a corresponding desktop user that accesses the desktop through the desktop client. Thus, each of the desktop users accesses the desktop running in the primary regional datacenter 212 via the respective desktop client that is executed by a computing device operated by the desktop user. In this example, the desktops are non-persistent and therefore are not altered after a user finishes using the desktop.

The primary regional datacenter 212 includes an example desktop pool 230 that includes a series of primary desktops 232, 234, 236, and 238. The secondary datacenter 214 may create a secondary desktop pool 240 that includes secondary desktops 242, 244, 246, and 248. In this example, the primary desktops 232, 234, 236, and 238 are created from a desktop template 250 associated with the desktop pool 230 and stored in the primary regional datacenter 212. The secondary desktops 242, 244, 246, and 248 are created from a copy 252 of the desktop template 250. The copy 252 is updated whenever the template 250 is changed.

Similar to the system 100 in FIG. 1, different desktop pools may be supported by the primary regional data center 212 for groups of users. Example desktop pools may include a developer desktop pool, an engineering workstation pool, or a call center application pool. For example, the desktop template 250 in this example may be optimized for call center workers in a respective call center workers group. The desktop template is thus a standard call center desktop template that has all the applications, software drivers, and other configurations needed for any call center worker in the call center workers group to do their work. Based on this configuration, when a desktop user associated with the primary desktop pool 130 requests a desktop, the control plane 210 can instantiate the desktop from the template 250 by means of the appropriate APIs, and assign it to the desktop user. Desktop users connect through a desktop client such as the desktop client 222 to the regional data center 212.

Since the desktops 232, 234, 236, and 238 are not changed by the desktop users, the main requirement for the regional disaster recovery routine is that the secondary pool 240 needs to be kept ready with an up-to-date copy of the desktop template 250. Unlike the system 100 in FIG. 1, desktop snapshots and desktop recovery points are not required for the non-persistent desktops.

The disaster recovery routine for the system 200 is set up by the administrator for each desktop pool of the primary regional data center 212 such as the example desktop pool 230. The set up procedure includes defining a secondary (inactive) desktop pool such as the secondary desktop pool 240 in the secondary regional datacenter 214. The setup also includes creating redundant infrastructure in the secondary regional datacenter 214 to support the secondary pool 240. The resources may include regional data center gateways, the copy 252 of the desktop template 250 used by the primary pool 230, and other resources.

Changes to the desktop template 250 are propagated such that when the desktop template 250 used by the primary desktop pool 130 is modified, or replaced by a new desktop template, that desktop template is copied to the secondary desktop pool 140 in the secondary regional datacenter 214.

Some cloud desktop providers support the creation of a single desktop template such as the desktop template 250 that can be shared between regional datacenters or is automatically updated for all regional datacenters when it is modified. When that option is used, the synchronization of desktop templates is no longer required, because the desktop template 250 and the desktop template 252 are one and the same.

When a disaster event occurs, activation of disaster recovery occurs as a single action, to minimize the time required for desktop users to have desktop service restored. The administrator of the system 200 can decide to activate the regional disaster recovery with a single command. Alternatively, the control plane 210 can be configured with rules to automatically activate under certain circumstances. For example, there may be a pre-configured policy that whenever access to the primary regional datacenter fails for a period of time, such as 30 minutes, activation of disaster recovery could be triggered automatically. Another triggering condition could be an alert generated because of planned or unplanned maintenance windows on the part of a cloud desktop provider.

Administrators and affected desktop users are notified of a disaster event or other pending outage and informed of the brief maintenance period required, if any, to restore service. The control plane 210 sends the notification based on all its configurations of pools, groups, users, and regional disaster recovery. The desktop clients 222, 224, 226, and 228 are directed to avoid connection with the primary pool 240. The desktop clients 222, 224, 226, and 228 may provide helpful messages to understand why the primary pool 230 is not available.

Restoration of desktop functionality automatically begins by reassigning each desktop user to the secondary pool 240. The control plane 210 redirects the desktop clients 222, 224, 226, and 228 to the secondary desktop pool 240. The redirection occurs to allow connection to the secondary desktop pool 240, providing a seamless experience to desktop users. The desktop users are notified that the disaster event has been mitigated. The desktop users may thus continue to operate the desktops that are now supported by the copy 252 of the desktop template 250 in the secondary regional datacenter 214.

The process for deactivation of a regional disaster recovery is also simpler for non-persistent desktop pools in the system 200 in comparison with the persistent desktop system 100 in FIG. 1. Once, the primary regional datacenter 212 is deemed to be available, completely functioning and uncorrupt, the deactivation process may begin. The returned status of the primary regional datacenter 212 may be based on health monitors or other sensors. The status may also be declared based on a judgement call by administrators.

Once the primary regional datacenter 212 is available, the deactivation process is declared. The control plane 210 begins preparing for the deactivation operation. Administrators and affected desktop users are notified of the recovery assessment and informed of the brief maintenance period required to restore service in the primary regional datacenter 212. The control plane 210 performs these operations based on all its configurations of pools, groups, users, and regional disaster recovery.

The desktop clients 222, 224, 226, and 228 are directed to avoid connection with the secondary pool 240. The desktop clients 222, 224, 226, and 228 may provide helpful messages to understand why the secondary pool 240 is not available.

The control plane 210 monitors the deactivation process and notifies administrators of the progress of the rehabilitation of the primary desktop pool 230 and its readiness at regular intervals. When the primary desktop pool 230 is ready, the control plane 210 redirects the desktop clients 222, 224, 226, and 228 to the primary desktop pool 230. The desktop clients 222, 224, 226 and 228 are redirected to allow connection to the primary desktop pool 230 thereby providing a seamless experience to desktop users. The desktop users are notified that the deactivation process is complete. The desktop users therefore continue their desktop use through the desktop template 250 of the restored primary desktop pool 230 run on the primary regional datacenter 212.

The control plane 210 frees up any resources required only during activation or deactivation. Thus, desktops in the secondary desktop pool 240 are deleted. Any other resources no longer needed such as replicated gateways, templates, other network resources are also deleted.

Additional related workflows may be provided as part of this solution for persistent desktops such as in the system 100 in FIG. 1. Such workflows may include a workflow for creating recovery points within the secondary desktop pool 140 during activation, to mitigate the possibility of another disaster event affecting the secondary regional datacenter 114. In the event of a new disaster event during activation, allowing a chained activation, for example to restore the secondary desktop pool 140 to a tertiary desktop pool in another, unaffected regional datacenter. Such workflows may also be used for persistent desktops such as those in the system 200 in FIG. 2. Thus, a desktop template for a primary desktop pool could be copied to a tertiary regional datacenter. Alternatively, a chain of desktop pools may be employed to mitigate the possibility of multiple disaster events affecting multiple regional datacenters.

Another related workflow may be modeled on the above disaster recovery workflows to handle employee relocations. The control plane 110 can use orchestration similar to the described regional disaster recovery routine to migrate desktop users from one persistent pool to another, even when there is no disaster event. For example, a desktop user with a persistent desktop may be transferred from one geographical location A to another geographical location B. The administrator can migrate the desktop user from a persistent pool in a regional datacenter with low-latency access from geographical location A, to a different regional datacenter with low-latency access from geographical location B. In this case, the regional datacenters are not considered as "primary" and "secondary" datacenters, but the process is the same as the regional disaster recovery process described above.

Throughout these workflows, the control plane 110 has the ability to manage the creation and deletion of cloud infrastructure resources to maximize their utilization and minimize the cost. Thus, the control plane 110 can retain desktop snapshots according to a policy that provides a tradeoff between risk and expense. The control plane 110 can create and store desktop snapshots an incremental basis, combined with a full copy baseline, to minimize the disk storage and bandwidth requirements. Copying of desktop snapshots between regional datacenters can be scheduled and throttled so as to minimize the network bandwidth resources required.

Figure 3:
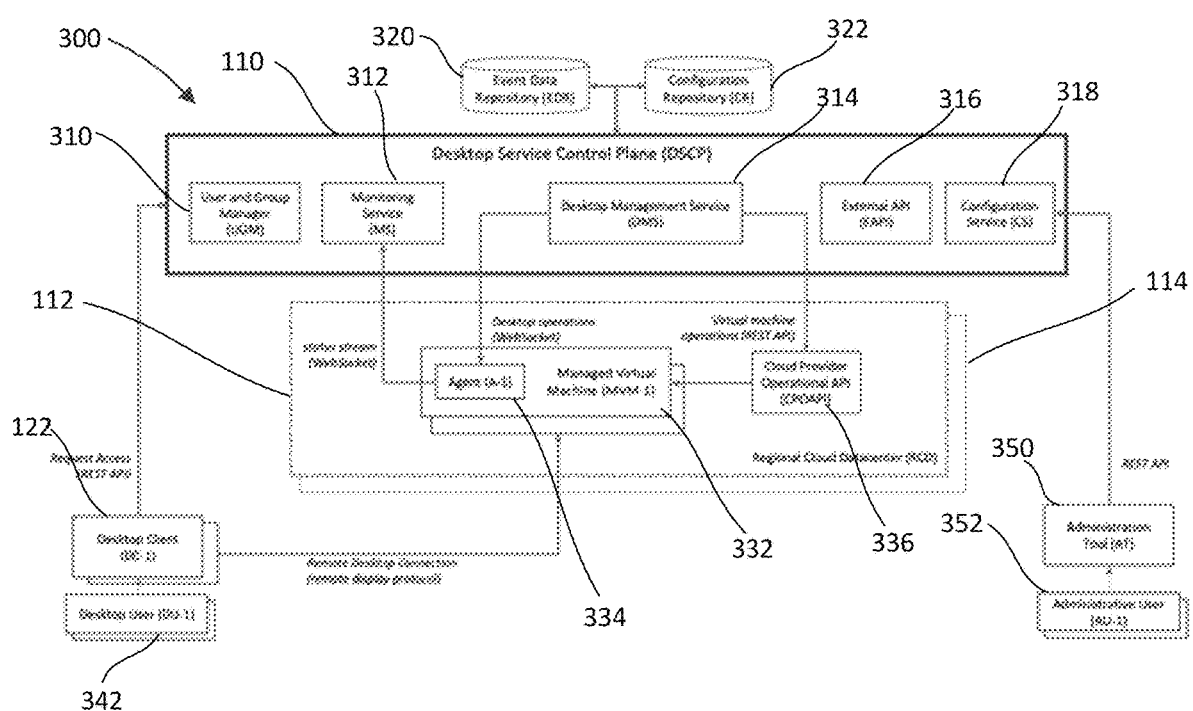
FIG. 3 is a block diagram illustrating the system architecture of the example control plane in FIG. 1.

FIG. 3 is a block diagram of an example architecture 300 of the control plane 110 in FIG. 1. The architecture may also be the same for the control plane 210 in FIG. 2. The control plane 110 includes a user and group manager 310, a monitoring service 312, a desktop management service (DMS) 314, an external API (EAPI) 316, and a configuration service (CS) 318. The control plane 110 may access an event data repository 320 and a configuration repository 322.

The architecture 300 includes the example primary regional cloud datacenter 112 and secondary regional cloud datacenter 114 in FIG. 1. Although only two regional datacenters 112 and 114 are shown, it is to be understood that the control plane 110 may facilitate numerous regional datacenters. An administration tool 350 is operated by an administrative user 352. As will be explained, the administration tool 350 allows the administrative user 352 to configure the control plane 110.

The monitoring service 312 makes both routine events and error events available to administrators and can analyze operational performance and reliability. The monitoring service 312 receives operational data from different agents monitoring the resources of the cloud desktop service system 100. The desktop management service 314 interacts with one or more managed virtual machines (MVMs) 332 in the regional cloud datacenter 112. These managed virtual machines 332 may include provision managed virtual machines of various types, including both desktop service resources (for example, gateways or desktop templates) and regional pools consisting of desktops themselves. The data center 112 also includes an agent software 334 installed on a managed virtual machine 332 that can perform desktop operations on, and collect data from, the managed virtual machine 332 at the direction of the control plane 110.

Operations are performed on a managed virtual machine 332 using a Cloud provider operational API (CPOAPI) 336 provided as part of the infrastructure as a service. For example, the operational API may be used for powering on or powering off a managed virtual machine. The external API (EAPI) 316 also supports integration and automation programmatically. Users and groups are registered and managed, and security roles are assigned.

The administration tool 350 works directly with the control plane 110 as its primary human interface. The administration tool 350 allows the administrative user 352 to configure the functions of the control plane 110 through the configuration service 318. The configuration service 318 supports editing and persistence of definitions about the desktop service, including subscription information and policies.

The flow diagrams in FIGS. 4-7 are representative of example machine readable instructions for the process of disaster activation and deactivation of a secondary regional datacenter for persistent and non-persistent desktops. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 4-7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 4:
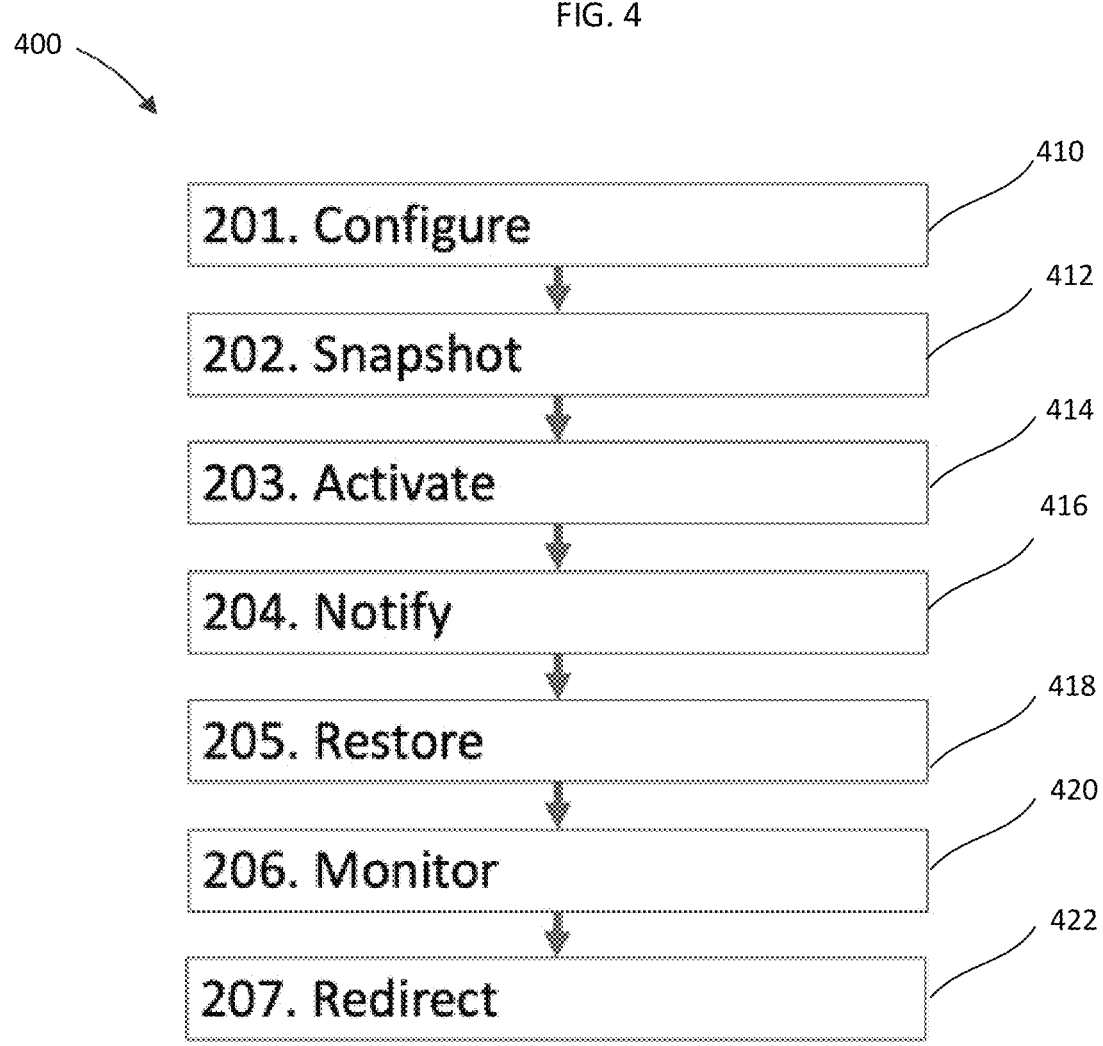
FIG. 4 is a flow diagram of the activation routine of disaster recovery for a system with persistent desktops.

FIG. 4 shows a routine 400 performed by the control plane 110 in FIG. 1 to provide disaster recovery for the regional datacenter 112 for persistent desktops. The routine first configures the primary desktop pool 130 for disaster recovery by defining desktop recovery points, defining the secondary desktop pool 140, creating redundant infrastructure, and specifying the timing of creation of desktop snapshots (410). The routine then creates backups of the desktops in the primary desktop pool on a regular basis (412). Once a disaster event occurs, the routine activates the disaster recovery (414).

The routine notifies the administrators and affected desktop users and directs the desktop clients to avoid connection with the primary desktop pool 130 (416). The routine then performs the restoration by provisioning new desktops with the desktop snapshots and reassigns the desktop users (418). To illustrate one manifestation of desktop restoration, a desktop is provisioned from a snapshot and then must be able to join the network domain available in the secondary regional datacenter. Because the snapshot may have been created from out-of-date network security credentials, the agent 334 handles renegotiating the credentials as orchestrated by the control plane 110. The control plane 110 monitors the process and notifies administrators of the progress (420). The control plane 110 then redirects the desktop clients to the secondary desktop pool 140 (422).

Figure 5:
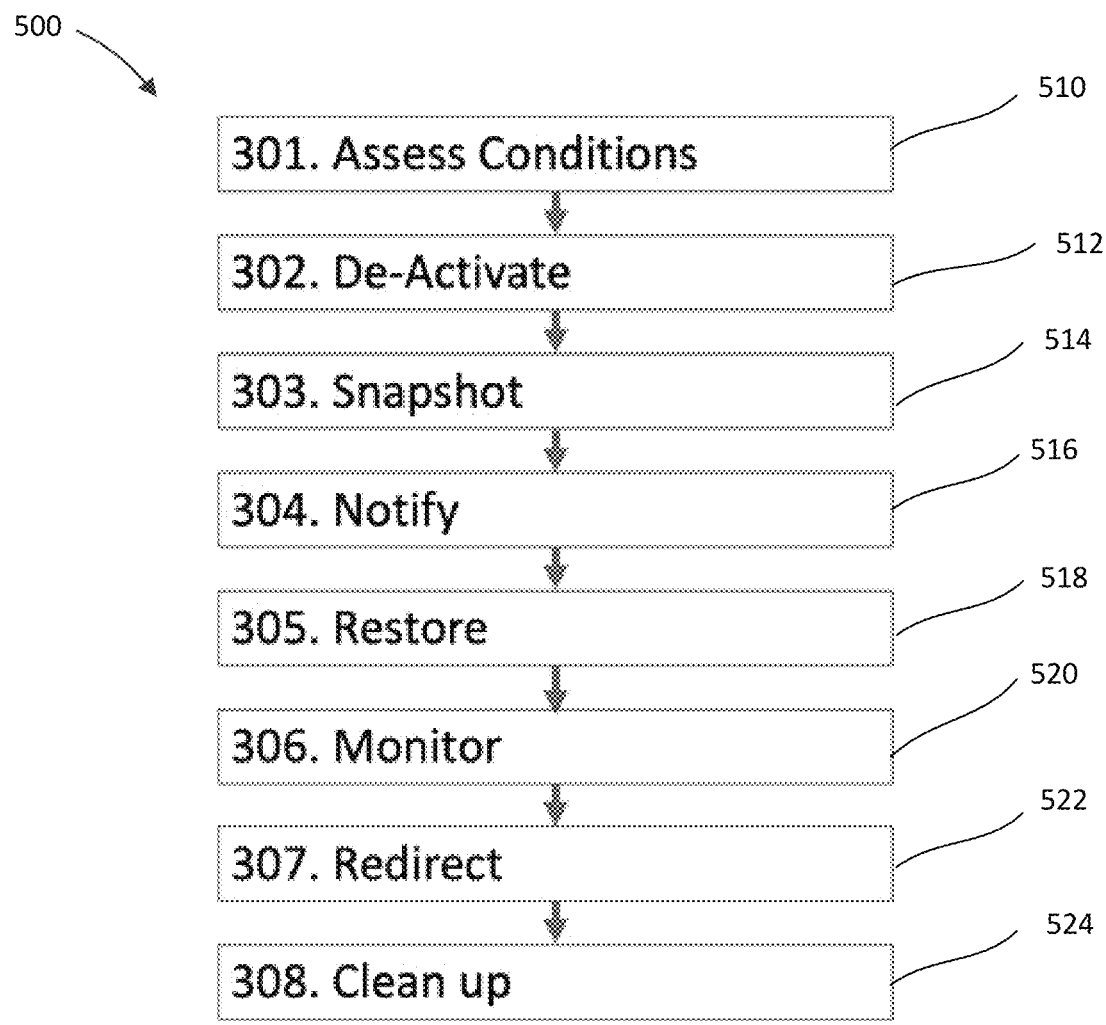
FIG. 5 is a flow diagram of the deactivation routine post disaster recovery for a system with persistent desktops.

FIG. 5 shows a deactivation routine 500 that occurs after the disaster event is over for a system that supports persistent desktops. The routine receives a positive assessment of the conditions indicating that the primary regional datacenter 112 is now available (510). The routine then initiates the deactivation operation and the control plane 110 beings preparing for the deactivation operation (512). The routine then creates desktop snapshots for the persistent desktops in the secondary desktop pool 140 (514). The routine then notifies administrators and affected desktop users, and directs the desktop clients to avoid connection with the secondary desktop pool 140 (516). The routine then performs the restoration by restoring the desktops from the desktop snapshots (518). The control plane 110 monitors the process and notifies administrators of the progress (520). The control plane 110 then redirects the desktop clients to the primary desktop pool 130 (522). The control plane 110 then deletes resources required for either activation and deactivation such as the desktops in the secondary pool 140 (524).

Figure 6:
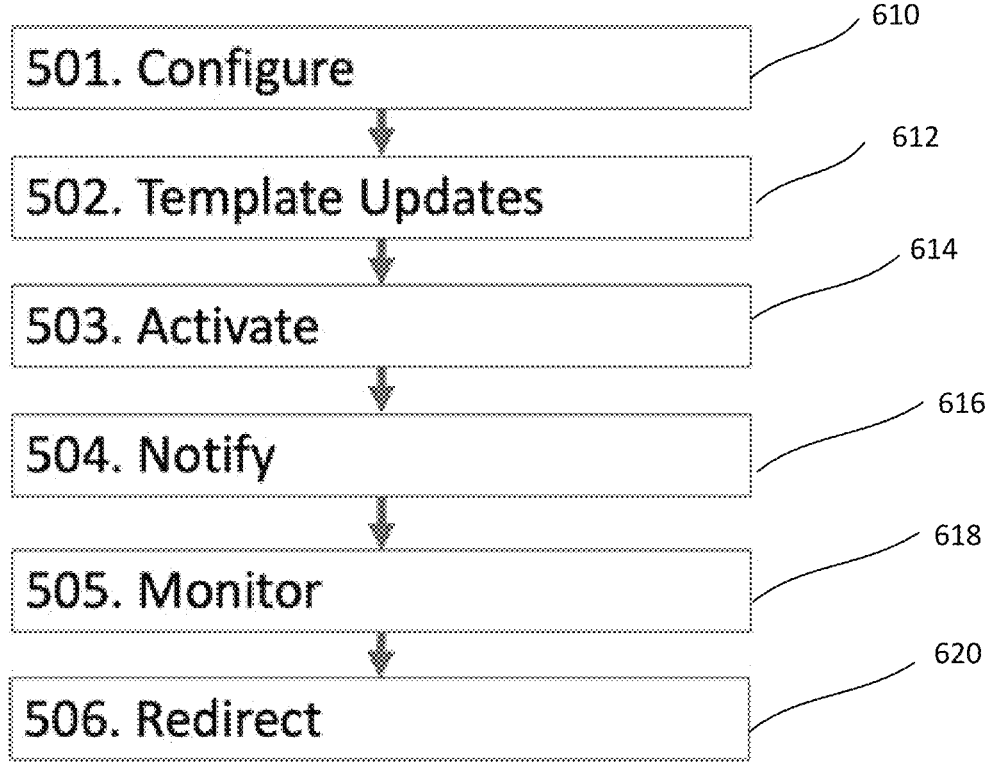
FIG. 6 is a flow diagram of the activation routine of disaster recovery for a system with non-persistent desktops.

FIG. 6 shows the activation routine 600 for disaster events for a system such as the system 200 in FIG. 2 with non-persistent desktops. The routine first defines the secondary desktop pool 240 and creates redundant infrastructure including a copy 452 of the desktop template 450 (610). The routine then propagates changes in the desktop template 450 such that a new desktop template due to changes is copied to the secondary desktop pool 240 (612). Once a disaster event occurs, the routine activates the disaster recovery either automatically or by user command (614).

The routine notifies the administrators and affected desktop users and directs the desktop clients to avoid connection with the primary desktop pool 230 (616). The routine then performs the restoration by reassigning the desktop users (618). The control plane 210 then redirects the desktop clients to the secondary desktop pool 240 (620).

Figure 7:
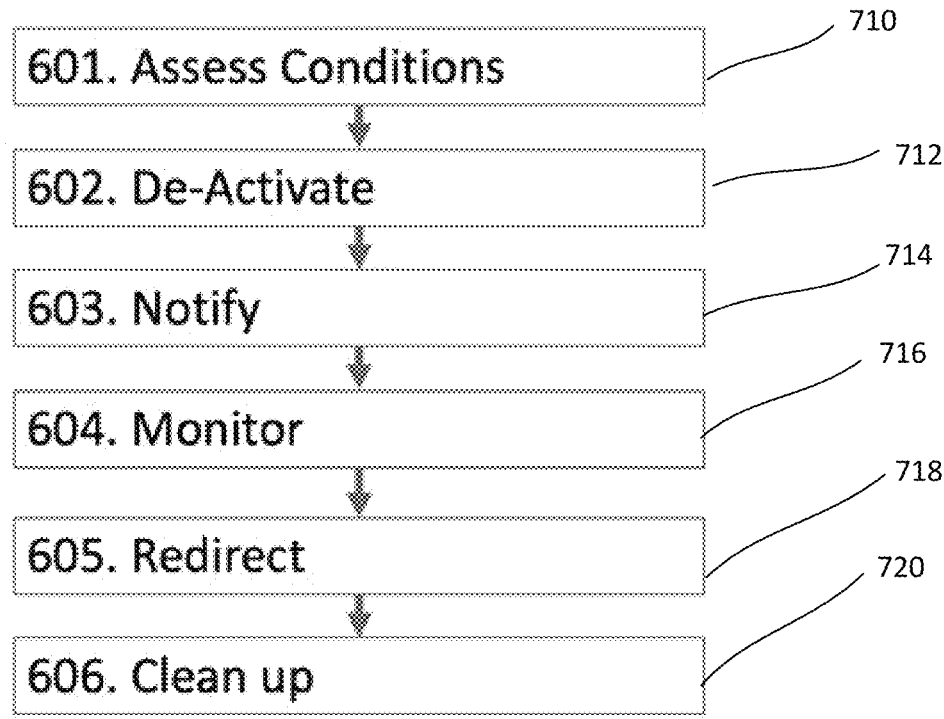
FIG. 7 is a flow diagram of the deactivation routine post disaster recovery for a system with non-persistent desktops.

FIG. 7 shows a deactivation routine 700 that occurs after the disaster event is over for the system 200 in FIG. 2. The routine receives a positive assessment of the conditions indicating that the primary regional datacenter 212 is now available (710). The routine then initiates the deactivation operation and the control plane 210 beings preparing for the deactivation operation (712). In one example implementation, the administrator can specify a schedule specifying when the operation will start. This workflow may include an option to begin the transfer of each desktop when the desktop user logs off their current session and confirms the operation. The routine notifies affected desktop users and directs the desktop clients to avoid connection with the secondary desktop pool 240 (714). The control plane 210 monitors the process and notifies administrators of the progress (716). It is assumed that the desktop template 252 in the secondary regional datacenter has not been modified during the period of disaster recovery. If this is not true, there a check may be performed to determine whether the desktop template 252 has been modified. If there is a change, the desktop template 250 in the primary regional datacenter must be synchronized with those changes. The control plane 210 then redirects the desktop clients to the primary desktop pool 230 (718). The control plane 210 then deletes resources required for either activation and deactivation such as the desktops in the secondary pool 240 (720).

Figure 8:
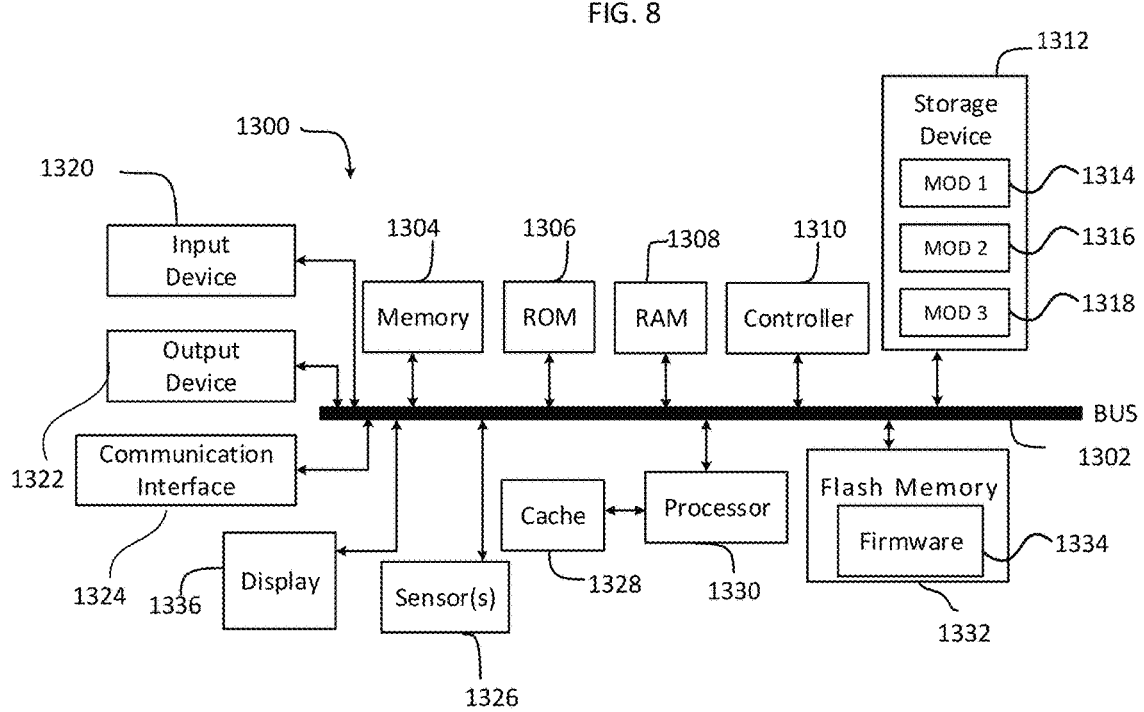
FIGS. 8 and 9 illustrate exemplary systems in accordance with various examples of the present disclosure.
Figure 9:
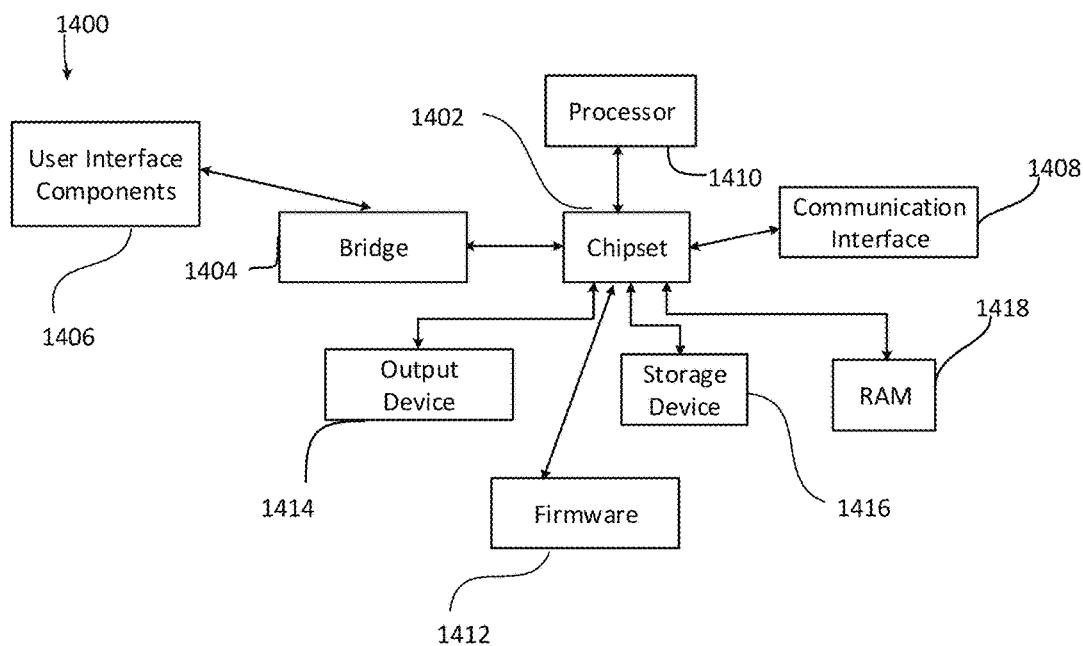

FIGS. 8-9 illustrate an example computing system 1300, in which the components of the computing system are in electrical communication with each other using a bus 1302. The system 1300 includes a processing unit (CPU or processor) 1330 and a system bus 1302 that couple various system components, including the system memory 1304 (e.g., read only memory (ROM) 1306 and random access memory (RAM) 1308), to the processor 1330. The system 1300 can include a cache of high-speed memory connected directly with, in close proximity to, or integrated as part of the processor 1330. The system 1300 can copy data from the memory 1304 and/or the storage device 1312 to the cache 1328 for quick access by the processor 1330. In this way, the cache can provide a performance boost for processor 1330 while waiting for data. These and other modules can control or be configured to control the processor 1330 to perform various actions. Other system memory 1304 may be available for use as well. The memory 1304 can include multiple different types of memory with different performance characteristics. The processor 1330 can include any general purpose processor and a hardware module or software module, such as module 1 1314, module 2 1316, and module 3 1318 embedded in storage device 1312. The hardware module or software module is configured to control the processor 1330, as well as a special-purpose processor where software instructions are incorporated into the actual processor design. The processor 1330 may essentially be a completely self-contained computing system that contains multiple cores or processors, a bus, memory controller, cache, etc. A multi-core processor may be symmetric or asymmetric.

To enable user interaction with the computing device 1300, an input device 1320 is provided as an input mechanism. The input device 1320 can comprise a microphone for speech, a touch-sensitive screen for gesture or graphical input, keyboard, mouse, motion input, and so forth. In some instances, multimodal systems can enable a user to provide multiple types of input to communicate with the system 1300. In this example, an output device 1322 is also provided. The communications interface 1324 can govern and manage the user input and system output.

Storage device 1312 can be a non-volatile memory to store data that is accessible by a computer. The storage device 1312 can be magnetic cassettes, flash memory cards, solid state memory devices, digital versatile disks, cartridges, random access memories (RAMs) 1308, read only memory (ROM) 1306, and hybrids thereof.

The controller 1310 can be a specialized microcontroller or processor on the system 1300, such as a BMC (baseboard management controller). In some cases, the controller 1310 can be part of an Intelligent Platform Management Interface (IPMI). Moreover, in some cases, the controller 1310 can be embedded on a motherboard or main circuit board of the system 1300. The controller 1310 can manage the interface between system management software and platform hardware. The controller 1310 can also communicate with various system devices and components (internal and/or external), such as controllers or peripheral components, as further described below.

The controller 1310 can generate specific responses to notifications, alerts, and/or events, and communicate with remote devices or components (e.g., electronic mail message, network message, etc.) to generate an instruction or command for automatic hardware recovery procedures, etc. An administrator can also remotely communicate with the controller 1310 to initiate or conduct specific hardware recovery procedures or operations, as further described below.

The controller 1310 can also include a system event log controller and/or storage for managing and maintaining events, alerts, and notifications received by the controller 1310. For example, the controller 1310 or a system event log controller can receive alerts or notifications from one or more devices and components, and maintain the alerts or notifications in a system event log storage component.

Flash memory 1332 can be an electronic non-volatile computer storage medium or chip that can be used by the system 1300 for storage and/or data transfer. The flash memory 1332 can be electrically erased and/or reprogrammed. Flash memory 1332 can include EPROM (erasable programmable read-only memory), EEPROM (electrically erasable programmable read-only memory), ROM, NVRAM, or CMOS (complementary metal-oxide semiconductor), for example. The flash memory 1332 can store the firmware 1334 executed by the system 1300 when the system 600 is first powered on, along with a set of configurations specified for the firmware 1334. The flash memory 1332 can also store configurations used by the firmware 1334.

The firmware 1334 can include a Basic Input/Output System or equivalents, such as an EFI (Extensible Firmware Interface) or UEFI (Unified Extensible Firmware Interface). The firmware 1334 can be loaded and executed as a sequence program each time the system 1300 is started. The firmware 1334 can recognize, initialize, and test hardware present in the system 600 based on the set of configurations. The firmware 1334 can perform a self-test, such as a POST (Power-On-Self-Test), on the system 1300. This self-test can test the functionality of various hardware components such as hard disk drives, optical reading devices, cooling devices, memory modules, expansion cards, and the like. The firmware 1334 can address and allocate an area in the memory 1304, ROM 1306, RAM 1308, and/or storage device 1312, to store an operating system (OS). The firmware 1334 can load a boot loader and/or OS, and give control of the system 1300 to the OS.

The firmware 1334 of the system 1300 can include a firmware configuration that defines how the firmware 1334 controls various hardware components in the system 1300. The firmware configuration can determine the order in which the various hardware components in the system 1300 are started. The firmware 1334 can provide an interface, such as an UEFI, that allows a variety of different parameters to be set, which can be different from parameters in a firmware default configuration. For example, a user (e.g., an administrator) can use the firmware 1334 to specify clock and bus speeds, define what peripherals are attached to the system 1300, set monitoring of health (e.g., fan speeds and CPU temperature limits), and/or provide a variety of other parameters that affect overall performance and power usage of the system 1300. While firmware 1334 is illustrated as being stored in the flash memory 1332, one of ordinary skill in the art will readily recognize that the firmware 1334 can be stored in other memory components, such as memory 1304 or ROM 1306.

System 1300 can include one or more sensors 1326. The one or more sensors 1326 can include, for example, one or more temperature sensors, thermal sensors, oxygen sensors, chemical sensors, noise sensors, heat sensors, current sensors, voltage detectors, air flow sensors, flow sensors, infrared thermometers, heat flux sensors, thermometers, pyrometers, etc. The one or more sensors 1326 can communicate with the processor, cache 1328, flash memory 1332, communications interface 1324, memory 1304, ROM 1306, RAM 1308, controller 1310, and storage device 1312, via the bus 1302, for example. The one or more sensors 1326 can also communicate with other components in the system via one or more different means, such as inter-integrated circuit (I2C), general purpose output (GPO), and the like. Different types of sensors (e.g., sensors 1326) on the system 1300 can also report to the controller 1310 on parameters, such as cooling fan speeds, power status, operating system (OS) status, hardware status, and so forth. A display 1336 may be used by the system 1300 to provide graphics related to the applications that are executed by the controller 1310.

FIG. 14 illustrates an example computer system 1400 having a chipset architecture that can be used in executing the described method(s) or operations, and generating and displaying a graphical user interface (GUI). Computer system 1400 can include computer hardware, software, and firmware that can be used to implement the disclosed technology. System 1400 can include a processor 1410, representative of a variety of physically and/or logically distinct resources capable of executing software, firmware, and hardware configured to perform identified computations. Processor 1410 can communicate with a chipset 1402 that can control input to and output from processor 1410. In this example, chipset 1402 outputs information to output device 1414, such as a display, and can read and write information to storage device 1416. The storage device 1416 can include magnetic media, and solid state media, for example. Chipset 1402 can also read data from and write data to RAM 1418. A bridge 1404 for interfacing with a variety of user interface components 1406, can be provided for interfacing with chipset 1402. User interface components 1406 can include a keyboard, a microphone, touch detection, and processing circuitry, and a pointing device, such as a mouse.

Chipset 1402 can also interface with one or more communication interfaces 1408 that can have different physical interfaces. Such communication interfaces can include interfaces for wired and wireless local area networks, for broadband wireless networks, and for personal area networks. Further, the machine can receive inputs from a user via user interface components 1406, and execute appropriate functions, such as browsing functions by interpreting these inputs using processor 1410.

Moreover, chipset 1402 can also communicate with firmware 1412, which can be executed by the computer system 1400 when powering on. The firmware 1412 can recognize, initialize, and test hardware present in the computer system 1400 based on a set of firmware configurations. The firmware 1412 can perform a self-test, such as a POST, on the system 1400. The self-test can test the functionality of the various hardware components 1402-1418. The firmware 1412 can address and allocate an area in the memory 1418 to store an OS. The firmware 1412 can load a boot loader and/or OS, and give control of the system 1400 to the OS. In some cases, the firmware 1412 can communicate with the hardware components 1402-1410 and 1414-1418. Here, the firmware 1412 can communicate with the hardware components 1402-1410 and 1414-1418 through the chipset 1402, and/or through one or more other components. In some cases, the firmware 1412 can communicate directly with the hardware components 1402-1410 and 1414-1418.

It can be appreciated that example systems 1300 (in FIG. 13) and 1400 can have more than one processor (e.g., 1330, 1410), or be part of a group or cluster of computing devices networked together to provide greater processing capability.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A virtual desktop system comprising:
a primary regional datacenter including a first fabric region having a primary desktop pool providing access to a desktop to a desktop user of a desktop client;
a secondary regional datacenter including a second fabric region having a secondary desktop pool; and
a control plane including configurations and definitions required by a regional data center to manage the desktop, the configurations and definitions including configurations and definitions for a virtual network, clusters of gateways, and data storage, wherein the first fabric region is created within the primary regional data center by applying the configurations and definitions required to manage the desktop from the control plane, the first fabric region including a virtual network, clusters of gateways, and data storage within the primary regional datacenter in accordance with the applied configurations and definitions; and wherein the second fabric region is created within the secondary regional datacenter by applying the configurations and definitions for a virtual network, clusters of gateways, and data storage from the control plane, the expansion fabric region including a virtual network clusters of gateways, and data storage within the secondary regional datacenter in accordance with the applied configurations and definitions, wherein the control plane orchestrates communication between the desktop client and the primary and secondary regional datacenters, the control plane operable to create the desktop from the primary regional datacenter and perform an activation procedure when a disaster event occurs, the activation procedure including:
creating the desktop in the secondary desktop pool; and
directing the desktop client to the secondary desktop pool to access the desktop from the secondary regional datacenter.

2. The system of claim 1, wherein the control plane is further operable to deactivate the secondary desktop pool and redirect the desktop client to access the desktop from the primary desktop pool of the primary regional datacenter after the disaster event is over.

3. The system of claim 1, wherein the desktop is a persistent desktop and wherein the copy is created by creating a snapshot of the desktop at a recovery point.

4. The system of claim 3, wherein the control plane is operable to create another snapshot on a periodic basis.

5. The system of claim 4, wherein the periodic basis is based on usage data of the desktop.

6. The system of claim 4, wherein the periodic basis includes postponing the creation operation until the desktop user terminates their session of the desktop.

7. The system of claim 4, wherein the creation of the desktop snapshot is performed incrementally relative to snapshots of other desktops in the primary desktop pool according to a policy to conserve time, bandwidth, or storage cost.

8. The system of claim 4, wherein the control plane provides multiple disaster recovery points corresponding to snapshots at different times and stores the snapshots.

9. The system of claim 8, wherein the desktop snapshots are kept according to a retention policy.

10. The system of claim 8, wherein the control plane is operable to suspend creating a desktop recovery point for the desktop of the secondary desktop pool, and wherein the control plane is operable to select an optional desktop recovery point for the primary desktop pool when the regional datacenter is reactivated.

11. The system of claim 4, wherein the control plane is operable to throttle copying of snapshots between the primary regional datacenter and the secondary regional datacenter to optimize cloud resources.

12. The system of claim 1, wherein the desktop is a non-persistent desktop created from a desktop template, and wherein the secondary regional datacenter includes a copy of the desktop template to create the desktop in the secondary desktop pool.

13. The system of claim 12, wherein the control plane is operable to copy the desktop template whenever a change is made to the desktop template.

14. The system of claim 12, wherein the control plane is operable to access the desktop template across additional regional datacenters.

15. The system of claim 1, wherein the activation is performed automatically according to a preconfigured rule.

16. The system of claim 1, wherein the primary desktop pool is provided through a first public cloud provider and the secondary desktop pool is provided through a second, different public cloud provider.

17. The system of claim 1, further comprising a tertiary regional datacenter, and wherein the control plane is operational to execute a recovery routine to copy the secondary desktop pool to a tertiary desktop pool of the tertiary regional datacenter.

18. A method for ensuring service for virtual desktops supported by a regional datacenter and a secondary datacenter orchestrated by a control plane to allow a desktop client agent to access a desktop from a primary desktop pool of the regional datacenter, wherein the control plane includes configurations and definitions required by the regional datacenter and the secondary datacenter to manage the desktop, the configurations and definitions including configurations and definitions for a virtual network, clusters of gateways, and data storage, wherein a first fabric region is created within the primary regional datacenter by applying the configurations and definitions required to manage the desktop from the control plane, the first fabric region including a virtual network, clusters of gateways, and data storage within the first regional datacenter in accordance with the applied configurations and definitions; and wherein a second fabric region is created within the secondary regional datacenter by applying the configurations and definitions for a virtual network, clusters of gateways, and data storage from the control plane, the expansion fabric region including a virtual network clusters of gateways, and data storage within the secondary regional datacenter in accordance with the applied configurations and definitions, the method comprising:
creating a copy of the desktop from the primary desktop pool via the control plane;
accepting an activation via the control plane when a disaster event occurs;
creating the desktop in a secondary desktop pool of the secondary datacenter from the copy; and
directing the desktop client to the secondary desktop pool to access the desktop from the secondary regional datacenter.

19. The method of claim 18, further comprising deactivating the secondary desktop pool and redirecting the desktop client to access the desktop from the primary desktop pool of the primary regional datacenter after the disaster event is over.

20. The method of claim 18, wherein the desktop is a persistent desktop and wherein the copy is created by creating a snapshot of the desktop at a recovery point.

21. The method of claim 20, further comprising creating another snapshot on a periodic basis.

22. The method of claim 21, wherein the periodic basis is based on usage data of the desktop.

23. The method of claim 21, wherein the periodic basis includes postponing the creation operation until the desktop user terminates their session of the desktop.

24. The method of claim 21, wherein the creation of the desktop snapshot is performed incrementally relative to snapshots of other desktops in the primary desktop pool according to a policy to conserve time, bandwidth, or storage cost.

25. The method of claim 21, further comprising providing multiple disaster recovery points corresponding to snapshots at different times and storing the snapshots.

26. The method of claim 25, wherein the desktop snapshots are kept according to a retention policy.

27. The method of claim 25, further comprising:
suspending the creation of a desktop recovery point for the desktop of the secondary desktop pool; and
selecting an optional desktop recovery point for the primary desktop pool when the regional datacenter is reactivated.

28. The method of claim 21, further comprising throttling copying of snapshots between the primary regional datacenter and the secondary regional datacenter optimize cloud resources.

29. The method of claim 18, wherein the desktop is a non-persistent desktop created from a desktop template, and wherein the secondary regional datacenter includes a copy of the desktop template to create the desktop in the secondary desktop pool.

30. The method of claim 29 further comprising copying the desktop template whenever a change is made to the desktop template.

31. The method of claim 29, wherein the control plane is operable to access the desktop template across additional regional datacenters.

32. The method of claim 18, wherein the activation is performed automatically according to a preconfigured rule.

33. The method of claim 18, where the primary desktop pool is provided through a first public cloud provider and the secondary desktop pool is provided through a second, different public cloud provider.

34. The method of claim 18, further comprising executing a recovery routine to copy the secondary desktop pool to a tertiary desktop pool of a tertiary regional datacenter.

* * * * *